United States Patent [19]

Balfanz

[11] 4,234,777
[45] Nov. 18, 1980

[54] PROGRAMMED WELDING MACHINE WITH WELD HEAD SPEED OVERRIDE

[75] Inventor: Fredrick J. Balfanz, Waukesha, Wis.
[73] Assignee: C-R-O, Inc., Menomonee Falls, Wis.
[21] Appl. No.: 65,175
[22] Filed: Aug. 15, 1979

Related U.S. Application Data

[63] Continuation-in-part of Ser. No. 24,696, Mar. 28, 1979.
[51] Int. Cl.³ .............................................. B23K 9/12
[52] U.S. Cl. ............................ 219/125.1; 219/124.32; 219/124.34; 228/9; 228/45; 318/575; 318/593; 318/661
[58] Field of Search ........... 219/125.1, 124.22, 124.32, 219/124.34; 318/575, 576, 592, 593, 594, 567, 568, 569, 561, 661; 228/8, 9, 45

[56] References Cited

U.S. PATENT DOCUMENTS

| | | | |
|---|---|---|---|
| 3,132,291 | 5/1964 | Neander et al. | 318/661 |
| 3,258,776 | 6/1966 | Boyle et al. | 318/592 |
| 3,548,172 | 12/1970 | Centner et al. | 318/561 |
| 3,850,105 | 11/1974 | Aronstein et al. | 318/592 |
| 3,924,094 | 12/1975 | Hansen et al. | 219/124.34 |
| 4,010,346 | 3/1977 | Cecil et al. | 219/124.34 |
| 4,011,437 | 3/1977 | Hohn | 318/568 |
| 4,012,027 | 3/1977 | Hooper | 318/577 |
| 4,014,495 | 3/1977 | Oda et al. | 219/125.1 |

Primary Examiner—B. A. Reynolds
Assistant Examiner—Clifford C. Shaw
Attorney, Agent, or Firm—Andrus, Sceales, Starke & Sawall

[57] ABSTRACT

A welding machine includes a programming device to move a welding head relative to horizontal main X and Y axes, and to rotate the head about a vertical C axis. A sensor is connected to rotate with the welding head on a rotator. A sine cosine resolver is mounted on the rotator so that its shaft is geared to the rotator gear. Deviations from the programmed path which may occur in the weld groove are sensed by the sensor, which in turn causes the resolver output to drive a slide mechanism which defines deviation axes $X_d$ and $Y_d$ and which causes the weld head to move from its programmed path to the desired corrected path, when needed. The resolver includes a deviation correction control rotor winding and a second rotor winding, the latter selectively impressing signals on the $X_d$ and/or $Y_d$ slide mechanism drive to cause the welding head to effectively change speed independent of the program or of the existence of any deviation. In welding machines for simultaneously joining multiple pairs of workpieces, the speed control makes it possible to compensate for variations in gap widths.

7 Claims, 7 Drawing Figures

PROGRAMMED WELDING MACHINE WITH WELD HEAD SPEED OVERRIDE

This application is a continuation-in-part of co-pending U.S. patent application Ser. No. 24,696, filed Mar. 28, 1979.

BACKGROUND AND SUMMARY OF THE INVENTION

This invention relates to a programmed welding machine with a weld head speed override.

The invention is an improvement over certain concepts disclosed in my co-pending U.S. patent application Ser. No. 24,696, filed Mar. 28, 1979, entitled "Programmed Welding Machine with Continuously Monitored Override Control", and assigned to a common assignee.

Welding machines which have a programming device associated therewith for directing the welding head along a predetermined path have long been in use. The programming device may include apparati as numerical control (N/C), templates with tracer followers and the like. The welding machines have been used to manufacture large parts such as booms, c-frames, vehicle lift arms, etc., which may include not only straight line segments but also contoured segments.

In the manufacture of large parts such as those mentioned above, they have often been formed from an assembly of two or more individual pieces which have been initially created by flame cutting them with plasma or like torches from a large workpiece. The individual pieces are then tack welded if desired and fixedly positioned adjacent each other to form a groove or seam. A welding head is then moved along the groove to apply a bead which joins the pieces together.

In addition, contouring devices are already known which include a transverse beam or bridge which defines a transverse or X axis and which is movable along rails or the like which define a longitudinal or Y axis. A carriage mounted for movement along the bridge carries a metal working tool, such as a cutting torch or the like.

Furthermore, it is known to mount a sensing means such as a probe adjacent a welding head for the purpose of sensing the position of the edge of a groove or seam for welding, and to broadly provide a slide mechanism for adjusting the position of the welding head in accordance with the positional output of the probe.

In the above-identified co-pending patent application, a welding machine is provided wherein main horizontal X and Y axes are defined. A mounting device is carried beneath the carriage of the welding machine, for mounting an assembly comprising a welding head and a weld groove sensor. This mounting device comprises a rotator which defines a vertical C axis about which the tips of the welding head and sensor can be rotated.

A programming device, such as a numerical control arrangement or a tracer, is programmed in the usual manner to move the machine parts, and thus the welding head and sensor assembly, relative to the main X and Y axes, and may be used to turn the rotator so that the said assembly turns about the C axis. Programmed turning of the assembly is for the purpose of maintaining the sensor in a position ahead of the welding head along the welding groove, no matter what the contour thereof. A feedback from the main drive motors for the machine and rotator satisfies the programming device that the welding head and sensor assembly is where it is programmed to be.

In the device of the said co-pending patent application, the programming device is overridden in a manner so that the welding head is continuously moved from the programmed path to a desired corrected path defined by deviations in the weld groove, without affecting the program.

A slide assembly is connected between the machine carriage and the welding head and sensor assembly, with the slide assembly defining a plurality of axes of deviation, such as $X_d$ and $Y_d$. The slide assembly is adapted to be driven by motors, one for each axis of deviation, to cause translation of the welding head from its programmed path to the desired deviated path in accordance with the deviation in the weld groove.

For purposes of control of the slide motors, the shaft of a sine-cosine resolver is gearingly connected in a one-to-one relationship to a gear forming part of the rotator. The stator windings of the resolver are connected to the slide motors and are responsive to a voltage fed to the resolver rotor or shaft winding. The stator winding signal is responsive to the deviated position of the sensor in the weld groove relative to the programmed weld head position and, depending upon the amount of deviation, drives the slide motors to provide a correction in the welding head position.

The rotary position of the resolver shaft, and thus the rotor winding, relative to the stator windings, provides a setting of the resolver which determines the ratio of the relative corrective drive signals to be fed to the slide motors. The resolver shaft's rotary position is, in turn, responsive to the rotary position of the rotator, through the gearing connection.

As the welding machine is operated, the programming device drives the welding head along a straight or contoured path relative to the main X and Y axes, which is the generally desired path for forming the weld in a groove between two pieces to be joined. At the same time, the programming device may turn the rotator when necessary about the vertical C axis to maintain the sensor ahead of the welding head. Deviations from the programmed path in a direction perpendicular thereto are sensed by the sensor which, through the resolver, instructs the slide motors to move the welding head from its programmed path and along the $X_d$ and/or $Y_d$ axes to the actual desired deviated path.

Although the welding head is caused to deviate from its programmed path when needed, the programming device is unaffected thereby and may be used to weld other identical pieces which may have different deviations.

The embodiment of the device disclosed in the said co-pending patent application is adapted to join one pair of members into a single intergral unit along a weld seam. Said device also utilizes a resolver with a one-phase rotor and two-phase stator.

For purposes of increasing production, it would be desirable to weld a plurality of pairs of members so that more than one identical integral unit may be produced at the same time on the same machine. Generally, this could be accomplished by placing a plurality of weld heads on the transverse bridge, together with duplicate $X_d Y_d$ slides and controls, and by programming the weld path identically for each weld head. If a plurality of similar pairs of tack welded workpieces were positioned on the horizontal table, the weld heads would then join these pairs simultaneously.

The concept of multiple joining is subject to a major difficulty due to the fact that the gap width to be seam welded may vary from pair to pair. This is due to the fact that the preparatory tack welds, as well as the workpiece edges, will not be identical for each pair, because of tolerance variations.

In multiple seam welding, if the same respective portions of the various seam are identical in width, the machine can be programmed to provide identical weld head speeds which will lay down beads of proper width for the width of the gaps. These beads will all be the same. However, if the gaps are of different widths, and with the same speed as previously, the situation changes. A gap may be narrower than normal so that too much weld bead is laid down. Or, a gap may be wider than normal so that not enough weld bead is laid down. If one gap is too wide, while at the same time another is too narrow, it may be narrow, it may be necessary to set the machine speed for the narrow gap, thus creating an inadequate fill for the wide gap, and then doing a second special pass to fully fill the wide gap.

Attempts to vary the relative speeds of the bridge and/or carriage during an operating cycle to compensate for deviations of gap widths may pose substantial operational difficulties.

It is a task of the present invention to make it possible to simultaneously weld seams of varying width on the same machine without requiring multiple passes or complex relative speed adjustments between the bridge and carriage.

It is a further task to take advantage of the presence of an $X_d Y_d$ deviation correction control on a programmed welding machine to produce welds of high quality even when the gap widths vary from normal or from each other.

It is yet another task of the invention to utilize the said deviation correction control regardless of whether or not there is a deviation present and independent of the program.

Broadly, the inventive concept is directed to providing a relatively simple means for varying the operating speed of one or more of a plurality of weld heads in a selective manner and separate from the speed control for the bridge and/or carriage.

In accordance with one aspect of the invention, a device is provided to cause the $X_d$ slide and/or the $Y_d$ slide in a weld head mount of the type disclosed in the aforementioned patent application to selectively change the effective speed of a weld head along the seam in accordance with the particular gap width to be welded.

In accordance with another aspect of the invention, the rotor of the resolver in the deviation correction control of the type disclosed in the said patent application, is of the two-phase type, with one of the rotor windings being selectively controllable to impress a signal on the $X_d$ and/or $Y_d$ slide drive motors, independent of the program or the existence of any deviation, to move the weld head relative to the carriage, and thus change its effective speed. The selectively controllable rotor winding is disposed at 90° to the other rotor winding which is utilized in the deviation correction control.

In accordance with another aspect of the invention, when a deviation does occur, the deviation correction rotor winding and the speed variation rotor winding provide signals that are summed to drive the slide motors.

The various aspects of the invention are adapted to be incorporated into each weld head of a multi-seam welding machine.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
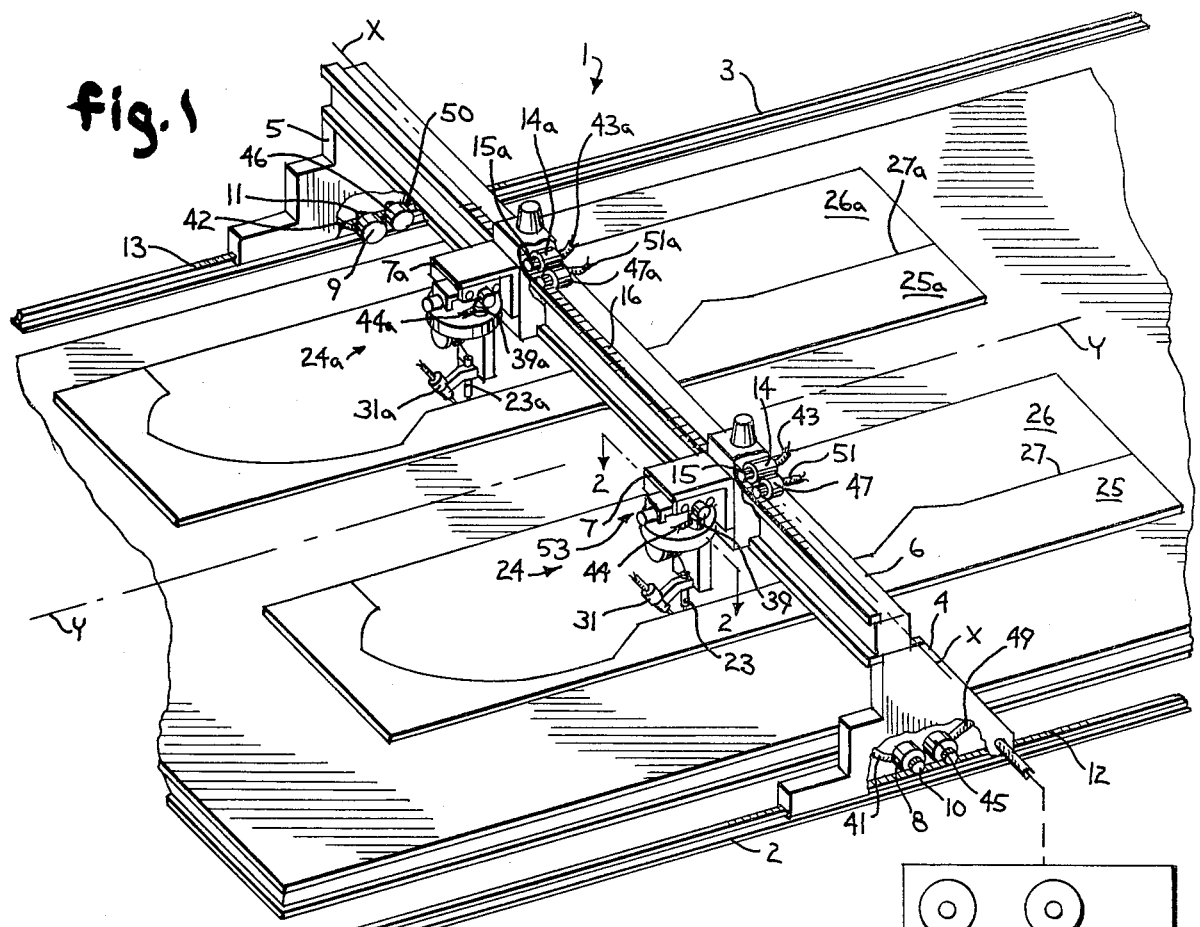
FIG. 1 is a perspective schematic view of a welding machine incorporating the concepts of the invention.
Figure 2:
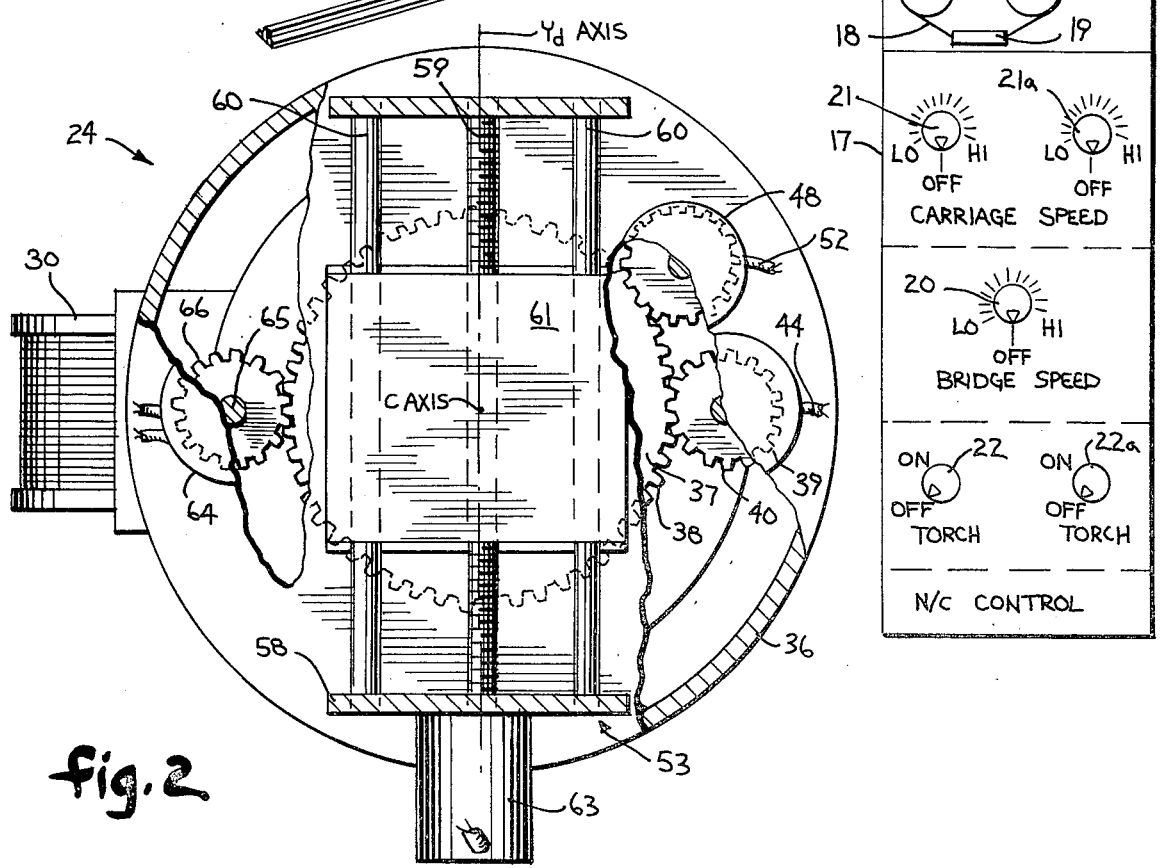
FIG. 2 is an enlarged horizontal section of the deviation correction control device for one of the weld heads, taken generally on line 2—2 of FIG. 1.
Figures 3, 4:
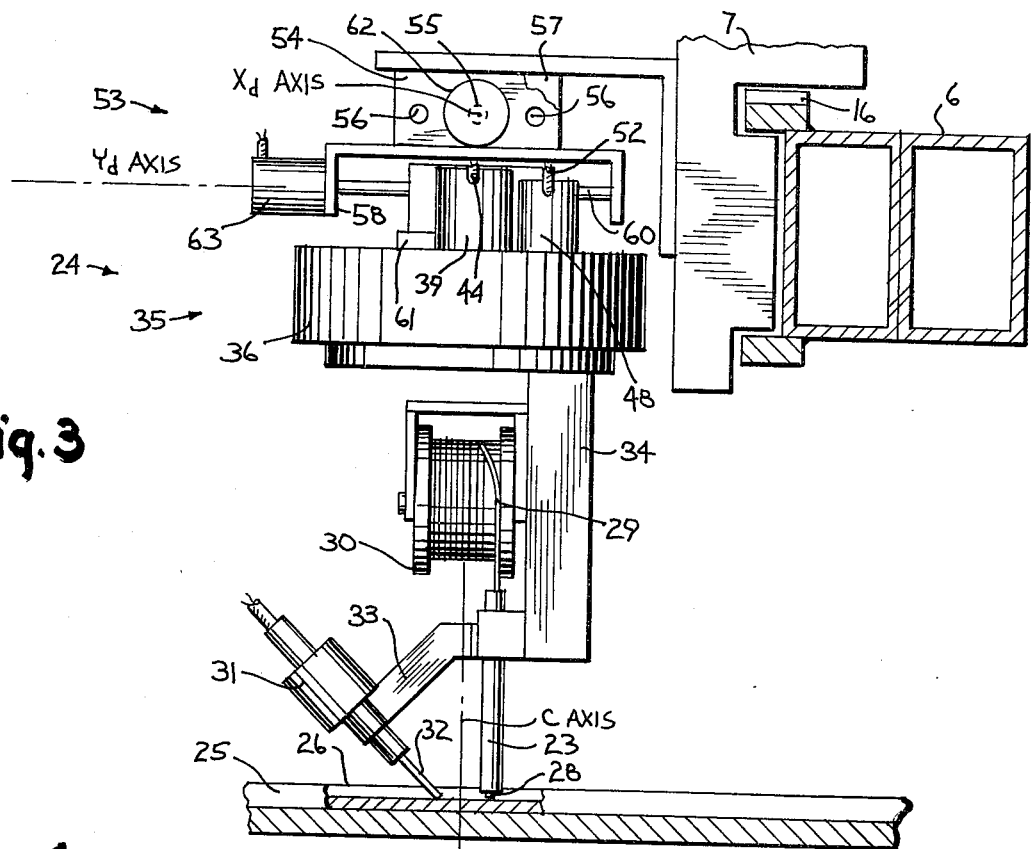
FIG. 3 is a vertical right side elevation of the weld head mount assembly of FIG. 2, with parts in section.
FIG. 4 is a schematic top plan view showing traverse of the machine over two pair of members to be joined.

Referring to FIGS. 1–3, the welding machine 1 is generally similar to that disclosed in the aforementioned co-pending patent application and is adapted to be mounted on a pair of longitudinal parallel rails 2 and 3 which are secured to the floor. The machine frame includes support gantries 4 and 5 which are mounted for movement along the respective rails, with the gantries supporting the ends of a transverse support or bridge 6 which extends over the welding area. A plurality of carriages, in this instance a pair 7 and 7a, are suitably mounted for movement along bridge 6.

Bridge 6 defines a main horizontal X axis, while rails 2 and 3 are parallel to a main horizontal Y axis, for purposes of reference.

Bridge 6 is adapted to be driven in the Y axis direction by any suitable motive means, such as motors 8 and 9 which are mounted in gantries 4 and 5 and which have respective pinions 10 and 11 which mesh with respective racks 12 and 13 disposed along rails 2 and 3. Similarly, carriages 7 and 7a are adapted to be driven along bridge 6 in the X axis direction by any suitable motive means such as motors 14, 14a on the carriages and which have pinions 15, 15a which mesh with a rack 16 disposed on the bridge.

A programming device is provided to control the operation of motors 8, 9, 14 and 14a, as well as other elements to be described. Such programming device is partially for the purpose of driving carriages 7 and 7a and their associated welding heads, to be described, along a desired path relative to the X and/or Y axes. The programmable device may be of any desired well-known type, such as is identified in the said co-pending patent application. The device, for example, may comprise a tracer which follows a template contour and drives the machine to reproduce the contour. and drives the machine to reproduce the contour.

It is believed that numerical (or N/C) control equipment is now the preferred programming system. As shown schematically in FIG. 1, an input control unit 17 is used to program and operate the numerical control equipment, which includes paper or magnetic tape 18 which passes through the usual pickup head 19 to create a suitable output for driving the aforesaid motors at a speed and in the direction desired to create a programmed path for the carriages.

As shown, unit 17 includes, among other things, a speed control knob 20 for bridge 6 in the Y direction, speed control knobs 21 and 21a for carriages 7 and 7a, and on-off buttons 22 and 22a for weld heads 23 and 23a which are mounted to the respective carriages. These knobs and buttons serve as manual controls for certain machine functions, the operative details and connections therefor being well-known in the art.

Weld heads 23 and 23a form part of a pair of welding assemblies 24 and 24a. Assemblies 24 and 24a are adapted to join two pairs of metal workpieces, comprising plates 25 and 26, and plates 25a and 26a. The pairs of workpieces have possibly been tacked together, but in any event have been fixedly mounted in a generally horizontal position beneath bridge 6. The respective pairs of workpieces are each positioned to form a seam or groove 27, 27a. See FIGS. 1 and 4.

Both assemblies 24 and 24a are substantially identical in structure and connections, so only assembly 24 will be described in detial.

Weld head 23 is provided with a tip 28 which may, for example, be supplied with welding wire 29 from a reel 30. Assembly 24 also includes a sensor including a probe 31 having a tip 32 and which is angularly mounted to head 23, as by a bracket 33. In the present embodiment, weld head 23 and probe 31 are fixedly suspended by brackets 34 from a rotator assembly 35 which is adapted to be rotated about a vertical axis generally perpendicular to axes X and Y and defined herein as the C axis.

Referring to FIGS. 2 and 3, rotator assembly 35 is suspended beneath carriage assembly 7, in a manner to be described, and includes a fixed housing 36 and a gear 37 having teeth 38, and which is rotatable about the said C axis. The rotational drive for gear 37 comprises, in the present embodiment, a motive means such as motor 39 which is fixedly supported on housing 36, and which has an output shaft gear 40 which meshes with teeth 38 of gear 37. Motor 39 is also connected to the programming device which causes the motor to be properly driven and thereby turn rotator gear 37.

Weld head 23 and probe 31 are positioned with their tips 28 and 32 in a generally horizontal plane.

During welding, it is desired that probe tib 32 preceeds weld head tip 28 along groove 27 so that tip 32 may properly act as a sensor of the groove position prior to tip 28 arriving at the same location. Thus, tips 28 and 32 are spaced apart, with axis C passing approximately midway therebetween. See FIG. 3. In some instances, the C axis may preferably pass other than midway between tips 28 and 32, including passing through one of the tips themselves.

Motors 8, 9, 14 and 39 are connected to the N/C control unit 17 through lines 41-44 respectively so that the programmed signals are caused to drive the motors in the usual well-known manner.

The numerical control is programmed to cause weld head 23 to traverse the general path of groove 27, both straight line or curved. This is the programmed path. In the case of a straight line parallel to one of the main axes X or Y, the numerical control not only moves the respective bridge 6 or carriage assembly 7 only along that axis, but also rotates rotator gear 37 into a fixed position so that weld head tip 28 and probe tip 32 are parallel to the path and that axis, with tip 32 leading. If the groove and programmed path are an angular straight line including components of both X and Y, the program causes both bridge 6 and carriage assembly 7 to move, and also turns ring gear 37 to a fixed position so that tips 28 and 32 are disposed parallel to the angular groove. If, however, groove 27 and the programmed path are curved, the program will not only move both bridge 6 and carriage assembly 7, but will cause gear 37 to continuously rotate to maintain tips 28 and 32 in a constantly shifting line which tends to follow the tangent to the curve at any point.

As is usually the case with numerical controls and the like, a feedback mechanism is provided between the machine and the circuitry within N/C control unit 17 to signal the control that weld head tip 28 and probe tip 32 are where they should be at any given moment, according to the program. See FIGS. 1-3 which show feedback devices 45-48, which may constitute a resolver, a syncro receiver, a pulse encoder or the like, connected with racks 12, 13 and 16, as well as ring gear 37. The relative positional information which is sensed by devices 45-48 is fed back to numerical control unit 17 through respective lines 49-52.

The welding machine is constructed so as to sense deviations of the groove from the programmed path and to override the program to move the weld heads 23, 23a to a corrected welding position when necessary, all without upsetting or changing the basic program.

For this purpose, and in connection with assembly 7, probe 31 is connected to mechanism that, independently of the main program, causes welding assembly 24 and its rotator assembly 35 to traverse a correction course.

As best shown in the embodiment of FIGS. 1—3, a slide assembly 53 is disposed between carriage 7 and rotator assembly 35. Slide assembly 53 comprises an upper $X_d$ slide section suspended from carriage 7 as by a bracket 54 mounting a threaded lead screw or shaft 55. Shaft 55 extends parallel to bridge 6 and the machines main X axis, and is used to define groove deviations perpendicular to the main Y axis. Thus, its axis will be called the $X_d$ axis. A pair of guide rods 56 extend parallel to threaded shaft 55 and, together with the latter, mount a block 57 which is threaded on the shaft. Assembly 53 includes a lower $Y_d$ slide section which is disposed at right angles from the upper slide section and which includes a bracket 58 mounting a threaded lead screw or shaft 59. Shaft 59 extends parallel to rails 2 and 3 and to the machine's main Y axis, and is used to define groove deviations perpendicular to the main X axis. Thus, its axis will be called the $Y_d$ axis. Rods 60 extend parallel to shaft 59 and mount a block 61 which is threaded on shaft 59 and from which rotator assembly housing 36 is suspended.

Motive means are provided to cause shaft 55 to turn to thereby drive block 57 and everything suspended from it, including weld head 23 and probe 31, along the $X_d$ axis. For this purpose, a reversible motor 62 is mounted on bracket 54 with its output connected to rotate shaft 55. Similarly, and as to the $Y_d$ axis, a reversible motor 63 is mounted on bracket 58 with its output connected to rotate shaft 59.

Motors 62 and 63 are adapted to be driven independently or together in accordance with deviations in groove 27 from the programmed path which are sensed by probe 31 as the welding operation progresses. For this purpose, the motors and probe are electromechanically connected by a resolver 64 which is fixedly mounted on rotator housing 36. Resolver 64 has the usual rotatable shaft 65 which extends downwardly, as more fully shown in said co-pending patent application, and with its lower end having a gear 66 which meshes with rotator gear 37. Resolver shaft 65 and rotator gear 37 are connected to rotate on a one-to-one ratio.

Resolver 64 is of the well-known sine-cosine syncro type having a two-phase stator and, in accordance with the present invention, a two-phase rotor. The indexed position of resolver shaft 65 is utilized to create an electrical output which is divided into $X_d$ and $Y_d$ coordinate voltage signals to drive motors 62 and 63.

Figure 5:
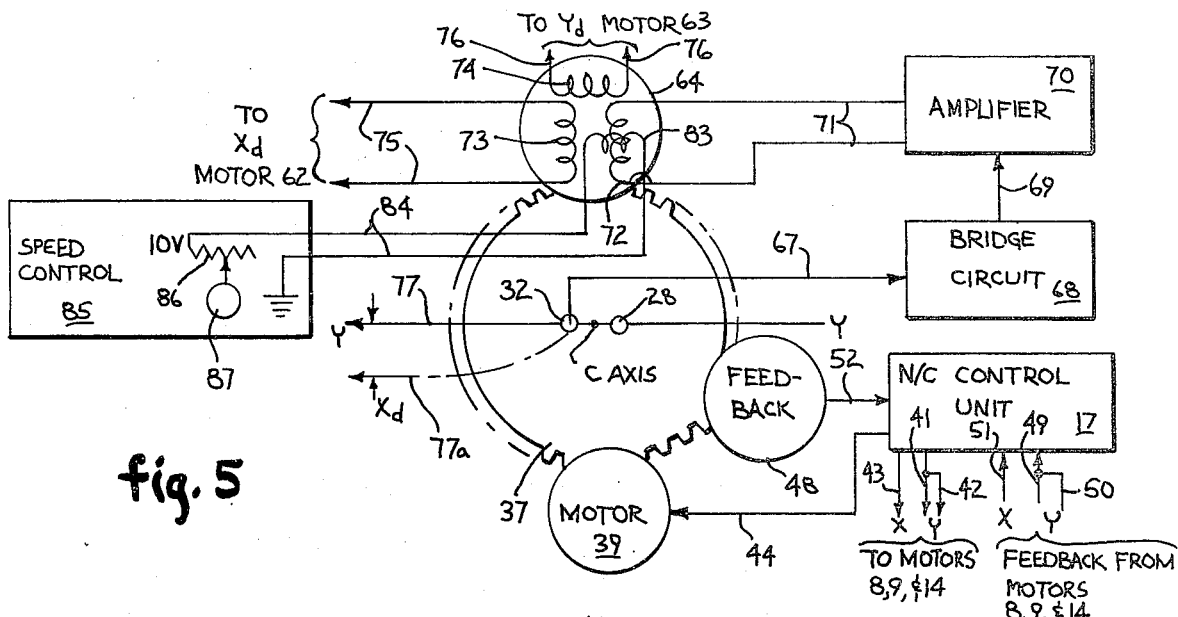
FIG. 5 is an electromechanical showing of the deviation correction system and weld head speed control of one of the weld heads, when the seam to be welded is parallel to the Y axis of the machine.

Referring to FIG. 5, and as more fully described in said co-pending application, probe tip 32 is biased toward central position, as by a spring. The biased position of tip 32 is such that the probe output feeds through a line 67 to a bridge circuit 68 which in turn is connected through a line 69 to a null-type amplifier 70. Bridge circuit 68 includes a power supply transformer and a pair of variable resistors connected in parallel. When the variable resistors are in normal balance, no signal is fed to amplifier 70. However, if a deviation occurs in groove 27, probe 31, which contains one of the resistors, will cause the resistors, and thus the bridge circuit, to become unbalanced, thereby causing a signal to be fed to amplifier 70.

Amplifier 70 is connected to feed through lines 71 to the first rotor winding 72 of shaft 65 of sine-cosine resolver 64. The respective $X_d$ and $Y_d$ stator windings 73 and 74 of resolver 64 are positioned at 90° to each other and are connected through lines 75 and 76 to $X_d$ motor 62 and $Y_d$ motor 63. If desired, suitable servo amplifiers may be inserted in the respective lines 75 and 76.

The operation of the mechanism for correcting for deviations from the programmed path in the weld groove is described more fully in the said co-pending application.

Briefly, and referring first to FIG. 5, if the groove or seam to be welded is programmed to be generally parallel to the Y axis of the machine, as at 77, gear 37 and resolver 64 are turned so that rotor winding 72 is parallel to $X_d$ stator winding 73 and at 90° to $Y_d$ stator winding 74, in a fixed preset. If probe tipe 32 senses a deviation in the $X_d$ direction from programmed path 77, as indicated at 77a, bridge circuit 68 will become unbalanced and feed a voltage signal through amplifier 70 to rotor winding 72. This induces a voltage signal only in $X_d$ stator winding 73 to thereby actuate $X_d$ motor 62 to cause its associated slide to shift weld head tip 28 to a corrected position independent of the program of unit 17.

Figure 6:
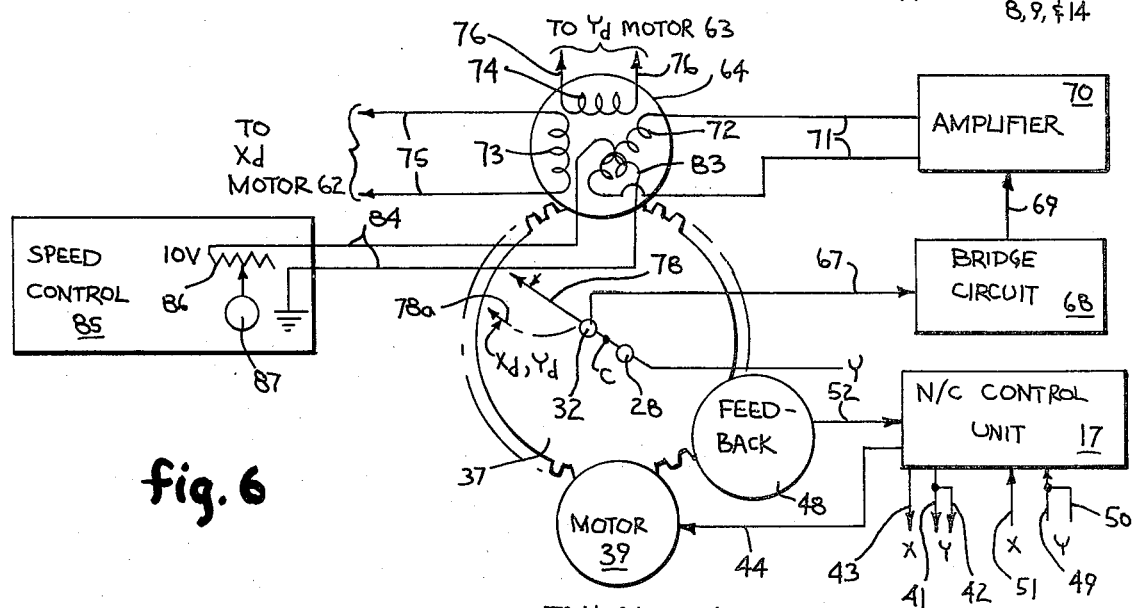
FIG. 6 is a showing similar to FIG. 5 when the seam to be welded is a straight line extending at an angle to the X and Y axes of the machine.

Referring to FIG. 6, if the seam to be welded is programmed to be a straight line angularly disposed to both the X and Y machine axes, as at 78, resolver 64 is turned so that rotor winding 72 is angularly disposed to $X_d$ and $Y_d$ stator windings 73 and 74, in a fixed preset. If probe tip 32 senses a deviation in the $X_dY_d$ direction from programmed path 78, as indicated at 78a, an unbalance voltage signal will be fed to rotor winding 72. A voltage signal will thus be induced in both $X_d$ and $Y_d$ stator windings 73 and 74 to actuate both motors 62 and 63 so that their associated slides shift tip 28 angularly to the corrected position.

Figure 7:
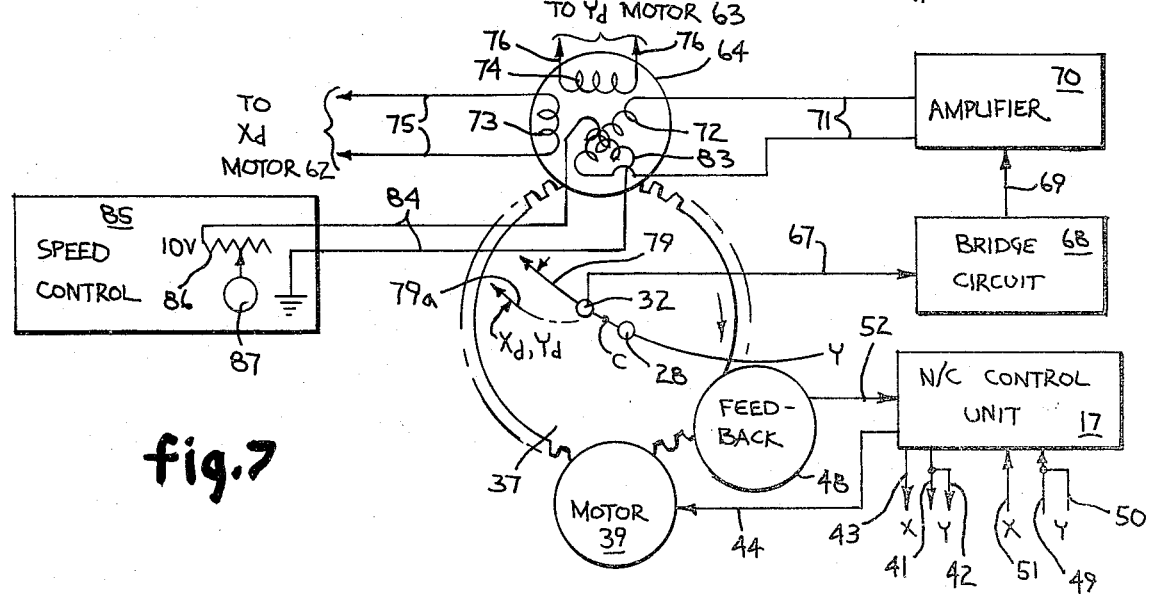
FIG. 7 is a showing similar to FIGS. 5 and 6 when the seam to be welded is curved.

With a curved programmed path 79 and deviated path 79a, as shown in FIG. 7, the operation is similar to that of FIG. 6 except that resolver shaft 65 is continuously rotated by the program, carrying with it rotor winding 72.

At times, it is desirable to weld together a plurality of workpieces such as 25, 26 and 25a, 26a simultaneously and along substantially similar weld paths 27, 27a. The machine described above can accomplish such welding using welding assemblies 24 and 24a, properly programmed. Deviations from either programmed path will be corrected by the override system discussed above.

However, and as best shown in FIG. 4, simultaneous welding of plural grooves or seams 27, 27a may pose problems. These seams are illustrated in substantially exaggerated form. Seam 27, to be traversed and welded by welding assembly 24, is shown as being relatively narrow and generally uniform in width throughout the portion shown. On the other hand, seam 27a, to be traversed and welded by assembly 24a, starts out narrow, as at 80, but then widens into a portion 81 which is wider than seam 27. This difference between the two seams may be due to tolerance variations in workpiece manufacture and in the previously discussed tack welding, not shown.

Normally, assemblies 24 and 24a are programmed to traverse their respective seams at the same given speed.

If the machine is programmed so that assembly 24 lays down a weld bead 82 which adequately fills the gap, when assembly 24a reaches wide seam portion 81, the weld bead laid down therein will not fill it because the overall machine speed is too fast. By the same token, a machine speed which will adequately fill seam 81 will cause overfilling of seam 27.

The concept of the invention provides a unique solution to this problem. The concept contemplates the provision of means independent from the program and separate from the bridge and carriage traverse controls to selectively change or control the speed of welding of one or more of the seams.

For this purpose, resolver 64 for welding assembly 7 is provided with a second rotor winding 83 which is mounted to shaft 65 and which is fixed at 90° to deviation correction rotor winding 72. See FIG. 5. Winding 83 is connected through lines 84 to an operator's control box 85 which may contain a suitable signal amplifier, not shown, and which also contains a voltage signal generator, including a variable resistance 86 operated by a manual control knob 87. Each welding assembly of a multi-seam welding machine would have a similar device. See FIG. 4.

Rotor winding 83 is adapted to selectively induce a voltage in stator windings 73 and/or 74, when desired, to cause the $X_d$ and/or $Y_d$ slides to shift weld head 23 forwardly or rearwardly at a desired variable speed relative to carriage 7. Because winding 83 is perpendicular to deviation correction winding 72, the former will cause movement in a direction parallel to the seam rather than transverse to it.

Since winding 83 is normally activated while carriage 7 is moving, the velocity and direction of movement of weld head 23 will be impressed on the velocity and direction of movement of carriage 7 to produce a compound summed movement.

Although the speed override of the present invention is intimately connected with the deviation correction system, by virtue of its use of the resolver shaft 65 and stator windings 73 and 74 as well as the $X_d Y_d$ slides, the speed override will function independently of the existence of any deviation in the groove or seam from the programmed path. Furthermore, the concept provides a device which is extremely flexible and capable of handling many types of differences between equivalent portions of a plurality of seams.

As an example, and referring to FIG. 4, let it be assumed that welding assemblies 24 and 24a are traversing seams 27 and 27a simultaneously at equal speeds along the Y axis in accordance with the machine programming, and are in the position shown in full lines. Resolver 64a is positioned so that speed control winding 83a is parallel to $Y_d$ motor winding 74a. Let it also be assumed that the speed of travel of assemblies 24 and 24a is such that weld beads 82 and 82a will properly fill the seams behind the assemblies, since the seams are of substantially the same width in that area. Knobs 87 and 87a are in the "off" position.

An observant operator will note that seam 27a becomes wider in front of the advancing assembly 24a, and knows that if the speed of the latter assembly is not changed, it will make an incomplete weld. Therefore, as seam portion 80 merges into portion 81, the operator takes one of a number of possible steps to correct for this situation. In the present example, he operates speed control knob 20 on unit 17 (FIG. 1) to slow down bridge 6 until welding tip 28a will lay a properly full bead in seam portion 81. This, of course, slows down welding tip 28 too much so that it would overfill the narrower seam 27. To prevent this, the operator now operates control knob 87 on box 85 so that it provides a positive or "forward" voltage signal to second rotor winding 83 of resolver 64. This signal will be induced in winding 74 for $Y_d$ motor 63, causing the $Y_d$ slide and thus weld head 23 to move forward on carriage 7 and parallel to the Y axis of the machine. By properly controlling knob 87, the operator can adjust the mechanism to bring tip 28 back to its original speed, which will now be created by a summing of the slower bridge speed and the advancing of weld head 23 in the Y direction on carriage 7.

Assembly 24 will now be traveling leftward faster than assembly 24a. The distance between assemblies and length of time that assembly 24 can move at a faster speed along the Y axis are limited by the length of threaded lead screw 59 on the $Y_d$ slide. However, if this becomes a problem, both lead screws 55 and 59 can be suitably lengthened.

As welding continues in the adjusted mode, welding assembly 24 continues to advance beyond assembly 24a until it reaches the end of the workpiece, in the position shown in phantom. The operator may then shut off or deactivate weld head 23 by pushing button 22 on unit 17. Bridge 6 will, of course, keep moving and carry the deactivated assembly 24 beyond the edge of the workpiece.

At the point where assembly 24 ceases to function, shown in phantom, assembly 24a will be behind and in a position such as that also shown in phantom in FIG. 4. All that now needs to be done is wait for the program to bring assembly 24a to the end of the workpiece and stop the operation altogether.

In the operation just described, and as an alternative, bridge 6 could be left at its original speed and knob 87a used to slow down assembly 24a by reversal. However, this method is less desirable.

During the operation described, wherein bridge 6 is slowed and assembly 24 is advanced relative to carriage 7 on the Y axis, there may or may not be any detectable deviations of the weld grooves from the programmed path. If there are not, first rotor windings 72 and 72a will remain deactivated. However, if a deviation does occur, windings 72 and/or 72a will become energized to also drive the slide mechanism.

Referring to FIGS. 4 and 5, if there is a deviation $X_d$ from the Y axis, as represented by path 77a, while assembly 24 is in the speeded up mode, then first rotary deviation winding 72 of resolver 64 will induce a voltage in $X_d$ winding 73 while second rotary winding 83 of resolver 64 will simultaneously induce a voltage in $Y_d$ winding 74. Both motors 62 and 63 will thus be activated.

FIGS. 6 and 7 are generally similar to FIGS. 7 and 8 of the said co-pending patent application, with the addition of the present inventive concept. In both instances, resolver 64 is turned so that both rotor windings 72 and 83 are angularly disposed relative to stator windings 73 and 74, but at a 90° offset to each other. If there is no deviation in the situation of either figure, with no signal at rotor winding 72, and if assembly 24 is in a speed-up or slow-down mode, a voltage signal will exist at rotor winding 83 which will be induced in both stator windings 73 and 74 to drive both slide motors 62 and 63. However, as shown in these figures, a deviation $X_d Y_d$ does exist, with deviation paths 78a or 79a. In this case, deviation rotor winding 72 will induce a voltage in stator windings 73 and 74, and so will speed control winding 83. Thus, slide motors 62 and 63 will be driven in accordance with the sum of the signals induced by both rotor windings 72 and 83.

Various modes of carrying out the invention are contemplated as being within the scope of the following claims particularly pointing out and distinctly claiming the subject matter which is regarded as the invention.

I claim:

1. In a welding machine for joining a plurality of pairs of metal pieces along substantially identical weld grooves disposed between said pieces:
   (a) a frame,
   (b) a plurality of carriages, each being mounted to said frame for movement relative to a respective first axis,
   (c) a rotator suspended beneath each said carriage and with said rotator being rotatable about a C axis disposed generally perpendicularly to said pieces,
   (d) a weld head suspended beneath each said carriage for forming a weld in one of said grooves,
   (e) a sensor suspended beneath each said carriage for following the contour of the respective groove in advance of the respective weld head,
   (f) each said weld head and sensor being rotatable with a respective rotator with respect to a said C axis,
   (g) first and second motive means:
       (1) to selectively drive each said carriage along its respective first axis, and
       (2) to rotate each said rotator about its respective C axis,
   (h) each said first and second motive means being actuatable in response to a programmable input control unit to cause each said sensor and weld head to traverse a programmed path at a given speed, and with said path generally corresponding to that of the respective groove, (i) program override means connected to each said rotator and responsive to a deviation in the respective groove perpendicular to the respective programmed path and sensed by the respective sensor to cause said rotator and its weld head to move from the programmed path to a corrected path which is in correspondence with the actual path formed by the respective groove, (j) and second override means connected to the program override means of each said rotator for selectively changing the speed of movement of the respective weld head in a direction parallel to the respective groove.

2. The welding machine of claim 1 wherein said second override means functions independently of the program of the said input control unit and independently of the existence of any said deviation.

3. The welding machine of claim 1:
(a) wherein each said program override means includes:
  (1) a slide assembly suspended from each said carriage and having a pair of slides movable in directions defining axes of deviation,
  (2) third motive means for selectively driving each of said pair of slides along said axes of deviation,
  (3) said slide assembly being connected to said rotator so that actuation of said third motive means causes said rotator to selectively move relative to said axes of deviation,
  (4) and electromechanical means having a first electrical input connected to each said sensor and an electrical output connected to the respective third motive means,
  (5) said electromechanical means being mechanically settable in accordance with the rotary position of the respective rotator as determined by the respective second motive means,
(b) and wherein said second override means includes a second electrical input for said electromechanical means.

4. The welding machine of claim 3:
(a) wherein each said electromechanical means comprises a sine-cosine resolver having a rotatable shaft connected for rotation with its respective rotator, and having a first rotor input winding and a pair of stator output windings connected to the respective third motive means,
(b) the connection between the respective sensor and the respective electromechanical means comprising means to selectively apply an electric signal to said first rotor input winding in accordance with the deviation sensed by the sensor to selectively activate said pair of stator output windings and thereby activate the respective third motive means to move the respective slides on their axes of deviation,
(c) and wherein the second electrical input of said second override means comprises a second rotor input winding in said resolver.

5. The welding machine of claim 4 wherein said second rotor input winding is offset 90° to said first input winding.

6. The welding machine of claim 5 which includes selectively actuatable means to apply an electric signal to each said second rotor input winding to thereby activate the respective third motive means independently of the existance of a signal at said first rotor input winding.

7. The welding machine of claim 6 wherein the construction is such that signals supplied simultaneously to both said first and second rotor windings are summed in the activation of said third motive means.

* * * * *

UNITED STATES PATENT AND TRADEMARK OFFICE
CERTIFICATE OF CORRECTION

PATENT NO. : 4,234,777

DATED : November 18, 1980

INVENTOR(S) : FREDRICK J. BALFANZ

It is certified that error appears in the above-identified patent and that said Letters Patent are hereby corrected as shown below:

Column 2, Line 55, delete "intergral" and substitute therefor ----integral----; Column 3, Line 8, delete "seam" and substitute therefor ----seams----; Column 3, Line 18, after "narrow," first occurrence, delete the phrase "it may be narrow,"; Column 4, Line 65, delete "and drives"; Column 4, Line 66, delete "the machine to reproduce the contour"; Column 5, Line 27, delete "detial" and substitute therefor ----detail----; Column 7, Line 48, delete "tipe" and substitute therefor ----tip----.

Signed and Sealed this

Third Day of March 1981

[SEAL]

Attest:

RENE D. TEGTMEYER

Attesting Officer     Acting Commissioner of Patents and Trademarks